Jan. 24, 1956 C. R. MYERS 2,732,036
DISC BRAKES OF THE SEGMENTAL DISC TYPE
Filed July 29, 1952 3 Sheets-Sheet 1

INVENTOR.
C. R. Myers
BY
Cobb & Cook
attorneys.

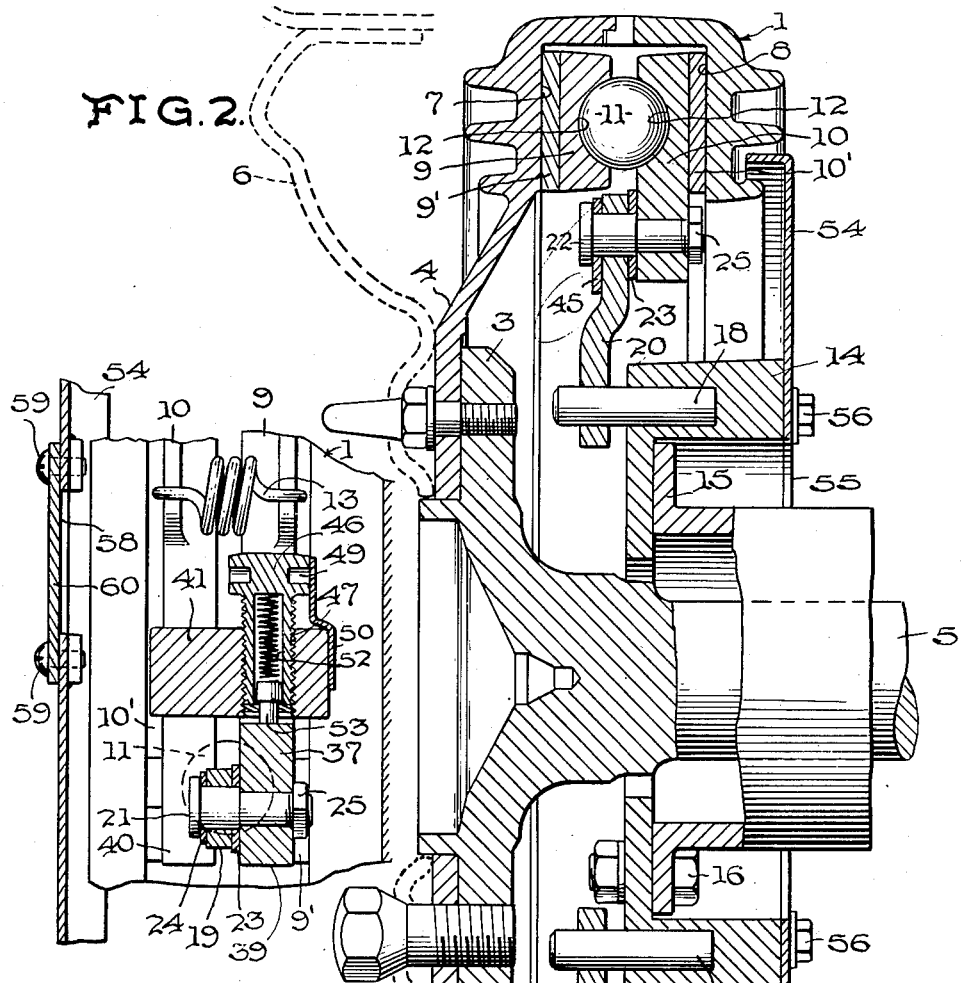

Jan. 24, 1956

C. R. MYERS 2,732,036

DISC BRAKES OF THE SEGMENTAL DISC TYPE

Filed July 29, 1952

INVENTOR.
C. R. Myers
BY
Robert Cobb
Attorneys.

United States Patent Office 2,732,036
Patented Jan. 24, 1956

2,732,036

DISC BRAKES OF THE SEGMENTAL DISC TYPE

Claude R. Myers, Galien, Mich., assignor, by mesne assignments, to Lambert Brake Corporation, St. Joseph, Mich., a corporation of Michigan Application July 29, 1952, Serial No. 301,558

22 Claims. (Cl. 188—72)

The present invention relates to brakes, and more particularly to an improved form of disc brake for automotive and other wheeled vehicles or for braking rotatable members of various types.

The trend in present-day automotive design and engineering is to increase the horsepower of the engines and to improve the efficiency of the power transmission systems, with resultant high-powered, fast automobiles and trucks. However, attempts by the automobile manufacturers at corresponding improvements in the brakes for such vehicles have not been entirely successful, with the result that many vehicles are no longer equipped with adequate brakes, or brakes which are capable of efficient and even action during repeated stops from relatively high speeds or during prolonged braking on long, steep grades, at which time the improved transmission systems afford little aid to the vehicle engine in slowing the vehicle up or holding the vehicle back.

Accordingly, it is a primary object of the present invention to provide an improved brake for wheeled vehicles which is extremely powerful, smooth and efficient in its braking action, and more than satisfies all of the present-day braking requirements.

Another object is to provide at a relatively low cost an improved brake which is extremely easy to install, service or repair, by reason of its simplicity of construction, which includes a completely removable braking unit.

A further object is to provide an improved brake of the self-energizing or servo-acting type, including novel means for controlling the servo-action under braking conditions when the coefficient of friction is at its peak, to thereby preclude any possibility of over-energization of the brake.

Still another object is to provide an improved disc brake comprising a rotatable housing adapted to be connected to a vehicle wheel or other rotatable part, a relatively stationary inner double-disc assembly adapted to be mounted on a support carried by the axle housing, axle shaft or other stationary part, this double-disc assembly including discs which are substantially in the form of a section or segment of an annulus, actuating mechanism for shifting said discs angularly relative to each other, camming means for spreading said discs axially apart into frictional engagement with the opposed inner surfaces of said housing responsive to relative angular movement thereof, and means for anchoring one disc or the other on the support while the other disc continues to move angularly responsive to frictional contact with the housing.

A still further object is to provide a disc brake according to the preceding paragraph which includes means, preferably in the form of pivotal links, for centering the inner double-disc assembly with respect to its support, these links being connected to the support on radial center lines and being connected to the discs at points slightly to one side of said center lines so that in operation the disc ends of said links will ride over-center slightly whereby a substantially true centering of the discs is maintained.

A further object is to provide a brake according to the foregoing objectives which includes means for cushioning anchoring movements of the respective discs to eliminate "clunk" caused by clocking of the inner double-disc assembly. This anti-clunk means preferably comprises a friction washer interposed between the disc ends of the aforesaid links and the discs, and an additional resilient washer is utilized to maintain a constant frictional drag therebetween, this frictional drag being produced by pressure of the bolts which are utilized to secure the links to the discs.

Another object is to provide a brake according to the foregoing objectives, which includes a pair of radially extended anchor or torque lugs on the support, with one disc having a portion anchoring on one lug and the other disc having a portion anchoring on the other lug when the brake is inactive, this anchoring engagement being maintained by the release springs for the brake. With this type of construction, rattle of the brake is completely eliminated, regardless of rough road conditions or the like.

And yet another object is to provide a brake according to the preceding object in which the anchor portions of both discs disengage the anchor lugs on the support upon initial actuation of the discs, thereby rendering the discs free to float on the links by which they are supported. Thus, frictional drag between the anchor lugs and the coacting lugs on the discs is eliminated, with attendant smooth operation and ease of actuation.

Still another object is to provide a disc brake including adjusting means which operates from the reverse anchor lug on the support to the reverse primary disc, i. e., the disc which anchors when the member to be braked is rotating in a reverse direction. By reason of this construction, clocking is reduced to a minimum as the friction lining material wears, thereby reducing anchoring shock and noise which result from large clearances between the torque or anchor lugs on the support and the coacting lugs on the discs.

Furthermore, an object is to provide a double-disc brake of the aforementioned type which includes a directional clocking control device operative to resiliently maintain the disc assembly always clocked in a forward direction, i. e., in a direction with the forward primary disc—the disc which anchors when the member to be braked is rotating in a forward direction—in anchoring engagement with the forward anchor or torque lug on the support. In accordance with this objective, I preferably utilize a spring-pressed plunger mounted in the end of an adjuster screw operatively mounted in the reverse torque or anchor lug on the support, said plunger acting on a lug formed on the reverse primary disc and serving to rotate the entire disc assembly in the aforesaid manner and to cushion clocking movements of the disc assembly in the opposite or reverse direction.

An additional object is to provide a disc brake including an inner double-disc assembly, the discs of which are in the form of segments of an annulus, thus providing a substantial gap between the opposite ends of the discs, the discs being preferably mounted with said gap disposed at the bottom of the assembly. This construction and arrangement of the discs eliminates dust trouble caused by the accumulation of lining material dust at the bottom of the brake. Moreover, this gap provides for better cooling of the discs. This gap also permits a novel emergency or auxiliary brake to be incorporated with the aforementioned brake.

Accordingly, it is another object to provide a brake of the type described in the preceding paragraph, which includes an emergency brake or auxiliary brake of novel construction, comprising a second inner double-disc assembly mounted on the common support for the main or service disc assembly, this auxiliary brake also having energizing balls or the like between the discs, and one of the discs anchoring on the support, while the other disc is free to clock with the member to be braked.

Other objects, features and advantages of this invention will be hereinafter described or will become apparent to those skilled in the art in the course of the following detailed description thereof in connection with the illustrative embodiment shown in the accompanying drawings.

In the drawings:

Fig. 2 is a view on an enlarged scale and in transverse section, taken on the line 2—2 of Fig. 1, looking in the direction of the arrows, with certain of the parts shown in elevation;

Fig. 3 is a fragmentary view on an enlarged scale and in vertical section as taken on the line 3—3 of Fig. 1, looking in the direction of the arrows;

Like reference characters designate corresponding parts in the several figures of the drawings and in the following description.

Figure 1:
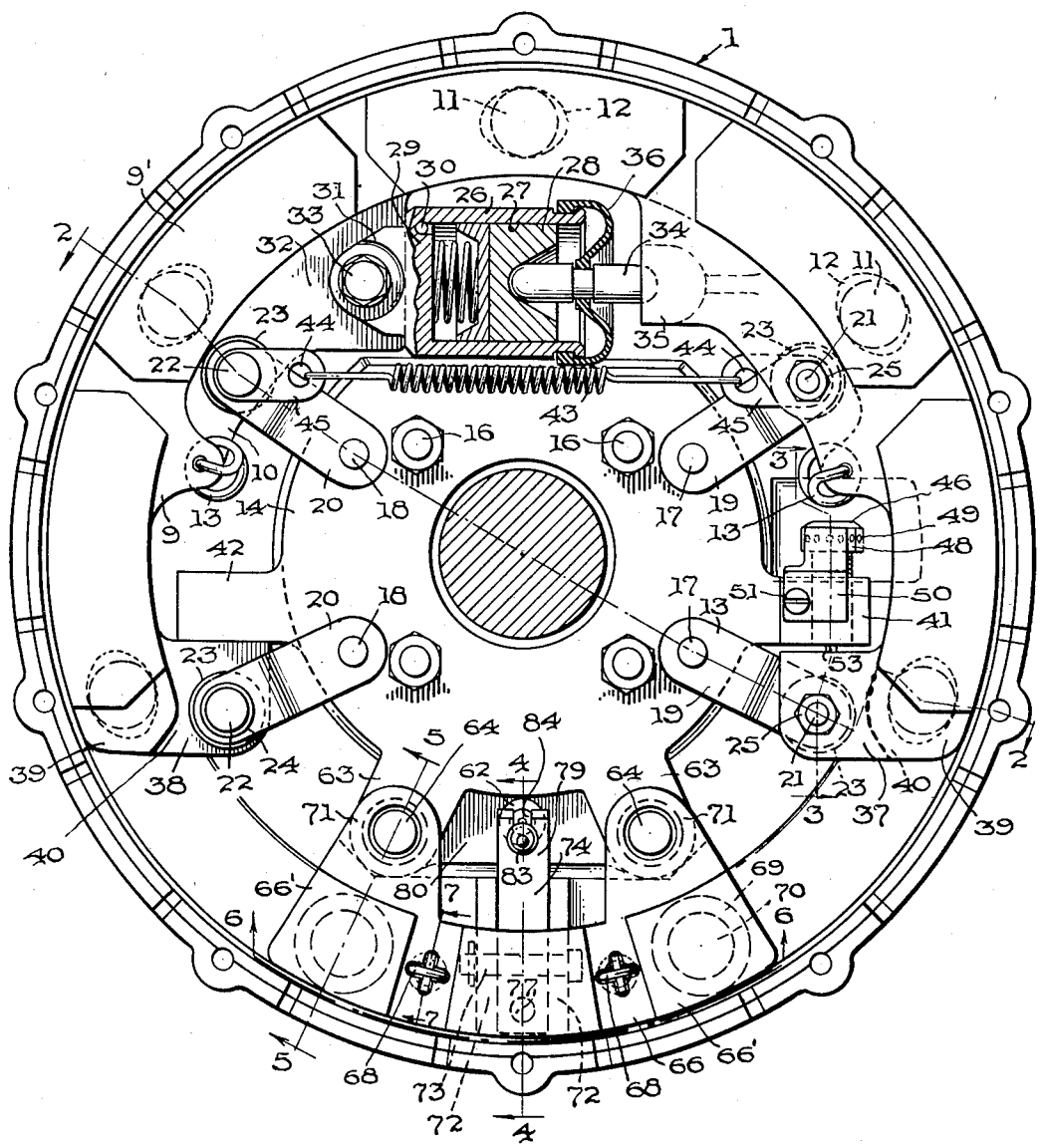
Fig. 1 is a view in side elevation of a brake embodying the novel features of the present invention, with the outboard side or half of the brake housing or member to be braked removed so as to more clearly disclose the inner double-disc assembles of both the service and auxiliary brakes, along with the supporting means therefor, certain parts of the assembly being broken away and shown in section.

Referring first to Figs. 1 and 2, 1 generally denotes a two-part brake housing or casing, the two parts of this housing being suitably secured together as by means of a number of circumferentially spaced bolts 2 extending through abutting marginal flanges on each section of the housing. The housing 1 is adapted to be mounted on a wheel mounting hub 3 of a vehicle by means of a radially inward projecting flange 4, as is customary in brakes of this type. Thus, the brake housing 1 is mounted on an axle 5 or the like, together with a wheel 6 (shown in broken lines in Fig. 2) for rotation therewith.

When assembled, the inner faces 7, 8 of the housing 1 constitute a pair of radially disposed, annular friction faces disposed in opposed, axially spaced relation to each other for frictional cooperation with an inner double-disc assembly comprising an outboard disc 9 and an inboard disc 10. These discs 9 and 10 are arranged back-to-back, with a plurality of hardened balls 11 disposed therebetween and seating in oppositely disposed and oppositely inclined or ramped seats 12 formed in the inner faces of the discs. A plurality of tension or return springs 13 connect the discs 9 and 10 together, thereby holding the balls therebetween, the force of the springs 13 urging the discs to assume a normal position with the balls 11 seated in the deepest part of the ramped seats 12. It is thus seen that the discs 9 and 10, with the balls 11 disposed therebetween and held together by the springs 13, constitute a unitary double-disc assembly.

As is customary in this type of brake, the outer faces of the discs 9 and 10 are preferably provided with segments or facings of friction lining material, as indicated at 9' and 10', respectively, this lining material being bonded or otherwise suitably secured to the discs in opposed relation to the radially disposed friction surfaces 7, 8 of the housing 1.

At the inboard side of the brake, there is a support or adapter plate 14 which is adapted to be fixedly mounted on a flanged axle housing 15, in the case of a rear wheel such as that shown in the drawings, by suitable bolts 16. The adapter 14 would be suitably modified, however, for attachment to the spindle of a front wheel mounting. The adapter 14 may be of any other suitable form, as may be required for various installations.

Located on radial center lines on the adapter plate 14 is a pair of sets of hardened pins 17 and 18, and the discs 9 and 10 are respectively slidably supported by said sets of pins by means of a corresponding number of pivotal pilot or centering and supporting links 19 and 20. The links 19 are each pivotally connected to the outboard disc 9 by means of a shoulder bolt 21, and the links 20 are likewise connected to the inboard disc 10 by means of shoulder bolts 22. For a purpose which will hereinafter be described, a friction washer 23 is interposed between each link 19 and 20 and the contiguous face of the respective discs, and a spring washer 24 is interposed between the head of certain of the shoulder bolts 21 and 22 and the contiguous face of the respective links 19 and 20, whereby a constant frictional drag may be set up between the links and the discs, as by tightening a nut 25 on the threaded end of the shoulder bolts. For illustrative purposes, a spring washer 24 is shown as being utilized in connection with only one of the bolts 21 and one of the bolts 22, namely, the lowermost bolts 21 and 22 shown in Fig. 1. However, if desired, such a spring washer may be associated with each of the bolts 21 and 22.

Suitable means for actuating the discs 9 and 10 are provided, and in the illustrated embodiment, said means have the form of a single hydraulic actuator cylinder 26 having a piston chamber 27 and a piston 28 reciprocable in said chamber. The actuator 26 has a closed end wall 29 having an inlet opening 30 therethrough leading into the piston chamber. A longitudinal extension 31 is formed on the end wall 29 of the cylinder and is secured to a radial projection 32 on the inboard disc 10 by means of a bolt or cap screw 33 or the like; and the piston 28 has a thrust pin 34 seated at one end in an axial depression therein, the other end of said thrust pin being engaged in a recess in the opposed face of a thrust receiving lug 35 which projects inwardly from the inner periphery of the outboard disc 9. A dust cap 36 is preferably fitted onto the end of the cylinder 26 and includes a central opening, the marginal edges of which engage in a groove in the periphery of the pin 34, this being an arrangement known in the art. Thus it will be seen that fluid under pressure may be forced into the piston chamber 27 through the port or opening 30, by any suitable means such as the usual master cylinder and fluid lines (not shown) with which most vehicles are equipped, and the actuator will force the discs to shift angularly or rotatively in opposite directions about their supporting links, in a manner to be later described.

Referring now particularly to Fig. 1, it is seen that the so-called discs 9 and 10 are actually only segments of an annular member and respectively have annularly spaced ends 39 and 40. The outboard disc 9 has a lug or projection 37 projecting inwardly from one end 39 thereof and the inboard disc 10 has a similar projection or lug 38 projecting inwardly from one end 40. These disc projections or lugs 37, 38 are adapted for anchoring engagement with a pair of anchor or torque lugs 41 and 42 which project outwardly from opposite sides of the support or adapter plate 14 into overlying relation to the disc lugs 37 and 38.

An energization control means in the form of a tension spring 43 suitably interconnected between the discs 9 and 10, in combination with the return springs 13, maintains the disc lugs 37, 38 firmly up against their respective anchor lugs 39 and 40 while the brake is inactive, by rotating the discs in opposite directions, and thereby moving the piston 28 in the chamber 27, and the cylinder wall 29 relatively toward each other. Preferably, the control spring 43 is provided with hooked ends 44 each engaged in an opening in one end of a connecting link 45. The other end of each link 45 is connected to the respective discs 9 and 10 by means of the aforementioned shoulder bolts 21 and 22.

According to another of the salient features of this invention, I provide clocking control means for maintaining the inner double-disc assembly always clocked in a forward direction, i. e., with the lug 38 on the end 40 of the inboard disc 10 in abutting engagement with its anchor lug 42. In the illustrated form, this feature is shown in association with means for adjusting the running or release clearance of the brake. This combined adjusting and clocking control means comprises a headed adjuster screw 46 threadedly engaged in a complemental screw threaded opening 47 in the reverse anchor lug 41, the lead end of said screw being directed towards lug 37 on the end 39 of the outboard disc 9. The head of the screw 46 may be of any desired form, but is preferably provided with a plurality of flat sides 48, and a recess 49 extends radially inward from each face 48. A leaf spring 50 having a portion secured to the anchor lug 41 by means of a screw 51 or the like, engages one of the aforesaid flat faces 48 so as to resiliently hold the screw 46 in selective adjusted positions against inadvertent rotation due to vibration or the like.

Interiorly of the screw 46, there is a hollow chamber 52 opening to the lead end of the screw, and a spring-pressed button 53 projects outwardly of the chamber into engagement with the opposed face of the lug 37 on the outboard disc 9. Thus it will be seen that the spring-pressed button 53 will tend to always shift the entire inner disc assembly in a clockwise or forward direction and thereby tend to maintain the lug 38 on disc 10 in anchoring contact with anchor 42, thus reducing anchoring movement of the lug 38 to a minimum, with attendant obviation of any undesirable "clunk" or "click," and as the friction lining wears, the screw 46 may be rotated to shift the disc 9 relative to disc 10, thereby spreading the discs axially apart slightly responsive to the camming action of the balls 11.

In addition to this adjusting and clocking control function of the screw 46 and spring-pressed button 53, the resilient force of the button 53 acts to resist clocking of the double-disc assembly upon reverse braking, that is, when the housing 1 is rotating in a counter-clockwise direction. This resilient resistance to reverse clocking cushions any objectionable noise or "clunk" which otherwise might occur upon anchoring engagement of the lug 37 with the reverse anchor 41.

Disposed at the inboard side of the brake is a splash shield or cover plate 54 provided with a suitable central opening 55 for permitting it to be applied over the end of the axle housing 15 or other part with which the brake is to be associated. This splash shield 54 is secured to the support or adapter 14 by means of a suitable number of screws 56 or the like; and the outer marginal edge thereof is preferably formed with a flange 57 projecting toward the housing 1 so as to substantially close the inboard side of the housing against the entry of mud, water and other foreign matter. Disposed in alignment with the aforementioned adjuster screw 46, the shield 54 is provided with an opening 58 for permitting the insertion of a suitable tool into the housing and into the recesses 49 in the head of the screw 46 for rotating the adjuster screw 46; and suitably secured to the shield, as at 59, so as to close the opening 58, is a removable closure 60.

Spaced from the margin thereof and at its lower side, the shield 54 is provided with an additional opening 61 (see Fig. 4), through which extends a conventional, flexible pull wire assembly 62 or the like which is adapted to actuate an auxiliary brake mechanism which will now be described.

Intermediate the anchor lugs 41, 42 on the adapter plate 14, there is a pair of radially projecting supporting lugs 63. Mounted in each of these lugs 63 is a pin 64 which projects outwardly toward the outboard side of the brake assembly. Disposed about the outwardly projecting portion of each pin 64 is an annular bushing 65 of suitable material such as rubber-impregnated fiber or the like. A segmental auxiliary inner double-disc assembly is supported on the pins 64 and comprises a primary disc member 66 and a secondary disc member 67, these disc members being connected together by means of a suitable number of tension or return springs 68. The discs are formed with conical seats 69 forming opposed pairs of seats when the discs are assembled back-to-back, and a hardened ball 70 is interposed between the discs in each opposed pair of seats. The disc 66 is formed with a pair of radially inwardly directed ears 71 which are preferably formed on their inboard sides at the extreme end thereof, with a cylindrical enlargement 72. Extending inwardly from the outboard side of the disc 66, in the portion 72 of the end of each ear 71, is a bore 73' of a diameter substantially corresponding to that of the pins 64, and a counter-bore 74' extends inwardly from the inboard side of each ear 71 in coaxial relation to the bore 73' and of a diameter substantially equal to that of the bushings 65. This construction permits the ears 71 of the disc 66 to be positioned on the pins 64, with the bushings 65 serving to dampen any noise from vibration or the like; and when the ears 71 are so positioned, the entire auxiliary brake assembly is supported on the pins 64.

Figure 6:
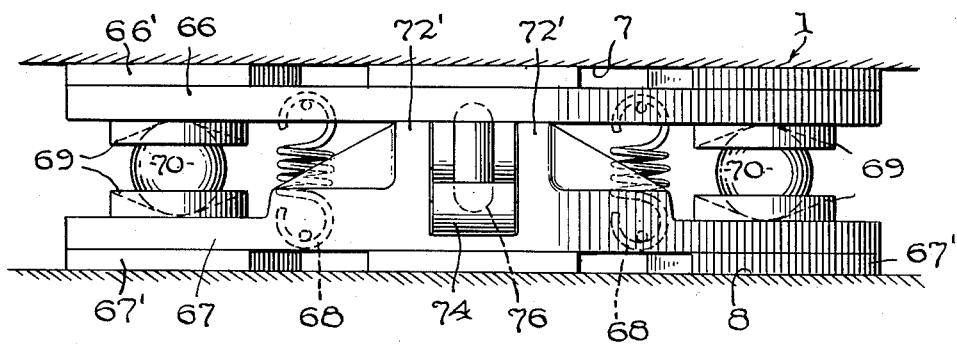
Fig. 6 is a sectional view on an enlarged scale as taken on the line 6—6 of Fig. 1, looking in the direction of the arrows.

Mechanical actuating means for the auxiliary discs is provided, and preferably in the form of the novel actuator arrangement shown in the drawings. As is best seen in Fig. 6, the inboard disc 67 is provided with a pair of spaced brackets 72' projecting at right angles therefrom toward the outboard disc 66. A pivot pin 73 extends through said brackets to provide a supporting fulcrum for a pivotal lever 74. An end 75 of the lever 74 is suitably formed to provide an arcuate recess or socket 76 in which is swivelly seated one rounded end of a thrust pin 77, the other rounded end of said pin 77 being seated in a recess or socket 78 in the portion of disc 66 opposite the socket 76 in the lever 74. The other end 79 of lever 74 extends inwardly beyond the inner margins of the discs 66 and 67 into substantial alignment with the opening 61 in the splash shield 54, and the adapter 14 is provided with a web portion 80 disposed between the lugs 63, and having an opening 81 therethrough through which the flexible member 62 extends. A set screw 82 engaged in a complemental opening in the web 80 is adapted to lock the flexible housing of the operating means 62 in place, while allowing the internal wire thereof to be shifted therein. The free end of said wire of the assembly 62 has a spherical member 83 secured thereto, and the end 79 of lever 74 is bifurcated as at 84 and provided with a semi-spherical seat 85 in which the member 83 seats, for operatively connecting said wire to the lever 74.

The segmental discs 66 and 67 are also provided with friction lining segments 66' and 67', respectively, for frictional engagement with the radially disposed friction faces 7 and 8 of the housing 1, upon rocking of the lever 74 in a direction to spread the discs 66 and 67 axially apart. Upon initial frictional engagement, any rotation of the housing 1 or any tendency to rotate in either direction will cause the disc 67 to clock therewith, thereby bringing the energizing balls into effect to spread the discs with still greater force, with attendent powerful braking action.

The foregoing clearly illustrates one structural embodiment of the brake or frictional device of this invention, and the operation thereof is as follows:

Assuming both the service and auxiliary brake elements to be disengaged, the discs 9 and 10 will have their respective anchoring end lugs 37 and 38 held in engagement with the anchor lugs 41 and 42 on the adapter plate 14 by the combined action of the return springs 13 and the energization control spring 43. It will be understood at this point that the effective anchoring portion of lug 41, in the illustration, may be the extreme end of the adjuster screw 46. As fluid under pressure is admitted to the actuator cylinder 26, the expansive force of the actuator tends to shift the two discs 9 and 10 angularly or rotatively in opposite directions, thus overcoming the opposed force of the return springs 13 and the energization control spring 43, with the result that the contact pressure between the respective disc lugs 37, 38 and their anchors 41 and 42 is relieved. The discs 9 and 10 are then substantially freely floating on their respective centering and supporting links 19 and 20 and the discs 9 and 10 are easily shifted axially apart, the links 19 and 20 sliding on the pins 17 and 18 responsive to the balls 11 rolling up the ramped seats 12. The clocking control means or spring-pressed button 53 meanwhile tends to maintain the entire inner double-disc assembly, including the discs and the actuator, clocked in a forward direction or in a clockwise direction as seen in Fig. 1. Therefore, in forward braking, when the radial friction faces 7 and 8 of the housing 1 are initially engaged by the opposed discs 9 and 10—responsive to the spreading action of the balls 11 riding up the ramped seats 12 upon the aforementioned relative angular movement of the discs—the inboard disc 10 or the forward primary disc is already anchored through its lug 38 on the forward torque or anchor lug 42 on the adapter 14 by the action of the clocking control means 53. Thus, any objectional noise or clunk is obviated which may have otherwise occurred upon engagement of lug 38 with the anchor 42, if there were any substantial clocking movement of the disc 10 in a direction to anchor. On reverse braking, however, the lug 37 on the reverse primary disc 9, must clock back into anchoring engagement with the end of the adjuster screw 46 or the anchor lug 41 itself, depending upon which it contacts first as is determined by the condition of adjustment of the discs. Upon such reverse or counter-clockwise clocking, the spring-pressed button 53 helps to cushion the clunk caused by such anchoring engagement. Also, according to a salient feature of this invention, the friction washers 23 interposed between the disc end of each link 19 and 20 and the disc, act as a cushioning means by dampening sudden clocking movements of the discs. The combination of the cushioning washers 23 and the clocking control means 53 cuts clocking movements to a minimum throughout the life of the friction lining 9', 10', and eliminates clunks or clicks caused by anchoring engagement even when the brake is applied very hard and suddenly while the housing is rotating at a relative high speed, at which time the conditions for anchoring clunks or noises are at a maximum.

In self-energizing brakes, such as the brake herein disclosed, the danger of over-energization is greatest upon initial contact of the coacting friction surfaces when a vehicle is travelling at a slow speed and the brake is applied with light pressure, for it is at this low range of surface speed and pressure that the coefficient of friction is said to be at its peak. Therefore, the energization control spring 43 is provided and acts to oppose the energizing power of balls 11 so as to preclude over-energization under conditions of low speed and low pressure brake engagement. But, at higher speeds and relatively higher hydraulic pressures, the energizing force of the balls 11 in the ramped seats 12 easily overcomes the controlling or restraining force of the spring 43, with resultant powerful braking action. In addition, when control means such as spring 43 is utilized, the angles of the ramps 12 may be lower than would otherwise be practical, with resultant increase in the capacity of the brake—i. e., the ramps may be disposed at an angle more nearly approaching zero, or an angle which otherwise might be a "locking angle."

Figure 4:
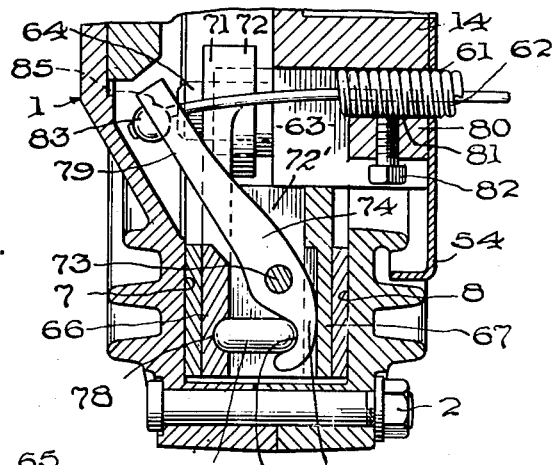
Fig. 4 is a fragmentary view on an enlarged scale in vertical section as taken on the line 4—4 of Fig. 1, looking in the direction of the arrows.
Figure 5:
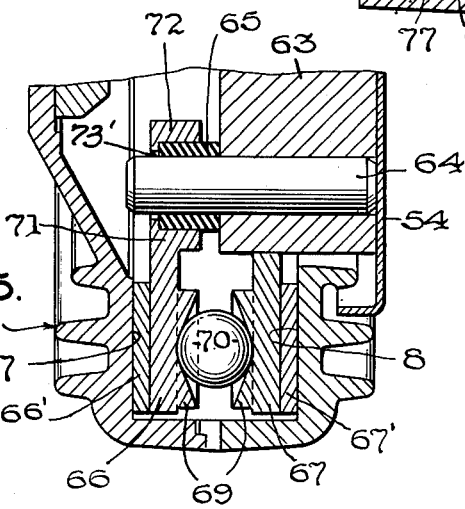
Fig. 5 is a fragmentary view on an enlarged scale and in section as taken on the line 5—5 of Fig. 1, looking in the direction of the arrows.
Figure 7:
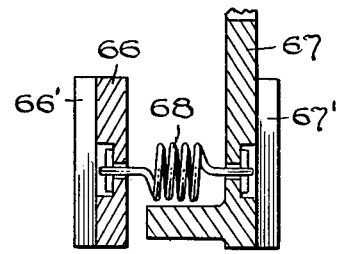
Fig. 7 is a fragmentary view on an enlarged scale and in section as taken on the line 7—7 of Fig. 1, looking in the direction of the arrows.

The operation of the auxiliary brake is somewhat similar to that of the service brake just described. In this auxiliary brake, however, the outboard disc 66 constitutes a continuously anchored primary disc regardless of the direction of rotation of the housing, whereas in the service brake, either disc 9 or disc 10 may constitute a primary disc, depending upon the direction of rotation of the housing. Disc 66 of the auxiliary brake is anchored through the supporting ears 71 on the pins 64, and when the flexible operating wire or the like is pulled by any suitable means (not shown), in a direction to rock the lever in a clockwise direction, as seen in Fig. 4, the discs are spread axially apart into engagement with the radial friction faces 7 and 8 of housing 1 against the release pressure of the assembly or release springs 68. When the housing 1 rotates in either direction, disc 67 clocks therewith and the balls 70 ride up the opposed conical seats to energize the brake and thus provide a powerful braking action.

It should now be understood that the brake of this invention has attained all of the objectives enumerated at the commencement hereof and has advantages of structure and operation which constitute a substantial improvement in brakes or friction devices of this type; and while the details thereof have been specifically described in the foregoing, it is not limited to such specific details alone, since changes and alterations may be resorted to without departing from the spirit thereof as defined in the appended claims.

I claim:

1. A friction device of the class described, comprising a rotary member to be braked having opposed inner friction faces, a support adapted to be connected to a relatively stationary member, an inner double-disc assembly shiftably mounted on said support and disposed between the friction faces of the rotary member, the discs of said inner double-disc assembly each being in the form of a segment of an annulus and having opposite, radially disposed friction surfaces engageable with the friction faces of said rotary member, means interengaged with said discs for shifting the same into engagement with said rotary member, energizing means between said discs, and means for anchoring one of said discs on said support.

2. A friction device of the class described, comprising in combination, a support, a rotary member to be braked, service braking means carried by said support and engageable with said rotary member, and auxiliary braking means also carried by said support and engageable with said rotary member, said service and auxiliary braking means each comprising a double-disc assembly, the discs of said double-disc assembly being in the form of segments of an annulus, means carried by the service braking means for actuating the same, means carried by the auxiliary braking means for actuating the same, and energizing means between the discs of each of said double-disc assemblies, said support constituting an anchor for at least one disc of each of said double-disc assemblies, and said rotary member having opposed radially disposed friction faces engageable by the discs of either of said inner double-disc assemblies upon operation of the respective actuating means.

3. A friction device of the class described, comprising a rotary member, friction means engageable with said rotary member, a support, means mounting said friction means on said support for rotative and axial shifting movements, actuating means for shifting said friction means angularly, self-energizing means for shifting said friction means axially responsive to angular movements thereof, cooperative anchor means formed on the support and on the friction means for anchoring the friction means on one anchor in one direction of rotation of the rotary member and on another anchor in the other direction of rotation of the rotary member responsive to clocking movements of the friction means on frictional engagement of the friction means with the rotary member, and clocking control means including resilient means carried by one of said anchors and acting on the friction means to rotate the same in a direction to anchor on another of said anchors.

4. A friction device of the class described, comprising a rotary member, friction means engageable with said rotary member, supporting means, actuating means for shifting said friction means into engagement with said rotary member, self-energizing means for increasing the power of said friction means, said friction means comprising an inner double-disc assembly carried by said supporting means, said supporting means having a reverse and a forward anchor lug thereon, and said discs each having a lug engageable with one of said anchor lugs for anchoring said inner double-disc assembly, return springs for said discs maintaining said disc lugs in engagement with said anchor lugs when the device is released, and adjuster means carried by said reverse anchor lug and having a portion thereof in engagement with its associated disc lugs.

5. A friction device as defined in claim 4, wherein the portion of the adjuster means which is in contact with the associated disc lug is provided with spring-biased means continuously urging said inner disc assembly into anchorage on said forward anchor lug.

6. A friction device as defined in claim 4, wherein said adjuster means comprises a threaded screw, said reverse anchor lug having a screw threaded opening therethrough in which said screw is threadedly engaged, said screw having a head thereon for engagement with an operating tool, and means for resiliently holding said adjuster screw in a selected adjusted position.

7. A friction device of the class described, comprising a rotary member having radially disposed friction means, disc means engageable with said friction means of the rotary member, an adapter plate, a plurality of links for mounting said disc means on said adapter plate, means pivotally connecting each of said links at one of its ends to said disc means, means pivotally and slidably connecting each of said links at its other end on said adapter plate with said disc means angularly and axially shiftable relative thereto, self-energizing means for shifting said disc means axially into engagement with said rotary member responsive to angular movement thereof, anchor means on said adapter plate on which said disc means anchors, actuator means engaged with said disc means for shifting the same angularly and out of anchoring engagement with said anchor means, and means associated with said links for frictionally resisting movement of said disc means back to anchoring engagement with said anchor means upon engagement of the disc means with said rotary member.

8. A friction device as defined in claim 7, wherein the means pivotally connecting each link to the disc means comprises a bolt, and the means frictionally resisting movement of said disc means comprises a friction washer mounted on said bolt and interposed between the link and the contiguous portion of said disc means.

9. A friction device as defined in claim 7, wherein the means pivotally connecting each link to the disc means comprises a headed bolt, and the means frictionally resisting movement of said disc means comprises a friction washer mounted on said bolt and interposed between the link and the contiguous portion of said disc means, a nut securing said bolt to said disc means, and resilient means interposed between the head of said bolt and the link for maintaining a predetermined frictional pressure of said friction washer on said disc means.

10. A friction device of the class described, comprising a rotary housing having opposed friction faces, an adapter plate, a segmental inner double-disc assembly disposed within said housing comprising a pair of segmental discs having annularly spaced ends, means supporting the discs of said disc assembly on said adapter plate comprising a plurality of pivotal links, anchor means disposed on opposite sides of said adapter plate, coacting anchor means on one end of each of said discs disposed for anchoring engagement with the respective anchor means on the adapter plate, actuating means engaged with said discs for shifting the same relatively angularly, camming means between said discs for spreading the same axially apart into engagement with the friction faces of said housing responsive to angular movement of the discs, and return springs resiliently holding said discs together with the camming means confined therebetween.

11. A friction device as defined in claim 10, combined with means associated with certain of said links for frictionally resisting clocking movements of said disc assembly from one anchor to another.

12. A friction device as defined in claim 10, combined with directional clocking control means, said means including a spring-pressed button carried by said adapter plate and engaged with one of said discs to maintain the opposite disc normally anchored in one direction.

13. A friction device as as defined in claim 10, combined with energization control means, said means including a resilient tension spring member having one of its ends connected to one of said discs and its other end connected to the other discs and yieldably resisting relative angular movement of said discs in a direction to engage the housing aforesaid.

14. A friction device of the class described, comprising a rotary housing having opposed friction faces, a support disposed at one side of said housing, an inner double-disc assembly having opposed friction faces engageable with those of the housing, means for mounting said disc assembly on said support, one disc only of said assembly having supporting means mounted on said disc assembly mounting means, camming means disposed between said discs, spring means shiftably supporting the second disc of said assembly on said one disc thereof, and actuating means carried by one of the discs for shifting the discs into engagement with said housing.

15. A friction device as defined in claim 14, wherein said actuator means comprises a lever pivotally mounted on one of the discs, one end of said lever being provided with means for connecting the same with operating mechanism, and means at the other end of said lever and engaged with the other disc for spreading the discs apart responsive to rocking movements of said lever.

16. A friction device as defined in claim 14, including a pair of spaced brackets on one of said discs, a pivot pin carried by said brackets, and said actuating means comprises a lever pivoted on said pin, one end of said lever being provided with means for connecting the same with operating mechanism, and means at the other end of said lever and engaged with the other disc for spreading said discs apart responsive to rocking movements of said lever.

17. A friction device as defined in claim 14, wherein said actuator means comprises a lever pivotally mounted on one of the discs, one end of said lever being provided with means for connecting the same with operating mechanism, the other end of said lever having a socket therein, a thrust pin having one end swivelly engaged in said socket, the other disc having a socket in opposed relation to said lever socket, and the other end of said thrust pin being swivelly engaged in said disc socket for spreading said discs apart responsive to rocking movements of said lever.

18. A friction device as defined in claim 14, wherein the means for mounting the disc assembly on the support comprises a pin projecting from said support and a bushing of cushioning material mounted on said pin, the supporting means on said one of the discs comprising an ear projecting therefrom, said ear having an opening therethrough, with the support pin projecting through said opening and said bushing engaged with the inner periphery of said opening.

19. A friction device of the class described, comprising a rotary member, friction means, a support, a plurality of links, means respectively located on center-lines extending radially from the axis of said support and supporting one end of each of said links on said support for axial shifting movement as well as for pivotal movement of said links, means pivotally connecting the other end of each of said links to said friction means, said connecting means being respectively located at one side of said center-lines, means for shifting said friction means rotatively relative to said support, with said connecting means riding over the respective center-lines aforesaid, and means for shifting said friction means axially into engagement with said rotary member responsive to angular movement of the friction means, said links constituting centering means for said friction means throughout rotative movement of the latter.

20. A friction device of the class described, comprising a rotary member having axially spaced and radially extended friction surfaces, a support coaxially disposed relative to said rotary member, a plurality of disc-like members, each of said disc-like members having a friction surface disposed in opposed relation to a friction surface of said rotary member, a plurality of links, certain of said links being pivotally connected at one end to one of said disc-like members, certain other of said links being pivotally connected at one end to another of said disc-like members, means mounting the other end of each of said links on said support for pivotal and sliding movements, actuating means for shifting said disc-like members angularly, and means responsive to such angular movement for shifting said disc-like members axially into engagement with the friction surfaces of said rotary member.

21. A friction device as defined in claim 20, wherein each disc-like member is in the form of a segment of an annulus and includes spaced ends respectively disposed on opposite sides of a diametrical center-line across said support, and the links connected to each disc-like member are located on one side only of said center-line.

22. A friction device of the class described, comprising a double-disc assembly unit, said assembly unit including a pair of disc-like members each in the form of a segment of an annulus, said members being disposed in back-to-back relationship and having radially disposed outer friction faces, cooperative camming means between said members, spring means connecting said members together, actuating means carried by said members, and a plurality of supporting links pivotally connected at one of their ends to said members, said links each being provided at their free end with means adapted to be removably mounted on a fixed support.

References Cited in the file of this patent

UNITED STATES PATENTS

| | | |
|---|---|---|
| 1,989,179 | Versluis | Jan. 29, 1935 |
| 2,185,435 | Goepfrich | Jan. 2, 1940 |
| 2,256,725 | Pierce et al. | Sept. 23, 1941 |
| 2,373,572 | Lambert | Apr. 10, 1945 |
| 2,374,536 | Goepfrich | Apr. 24, 1945 |
| 2,387,039 | Parrett | Oct. 16, 1945 |
| 2,526,149 | Myers et al. | Oct. 17, 1950 |
| 2,555,651 | Lambert et al. | June 5, 1951 |
| 2,633,941 | Zindler | Apr. 7, 1953 |
| 2,655,227 | Eksergian | Oct. 13, 1953 |

FOREIGN PATENTS

| | | |
|---|---|---|
| 875,195 | France | June 8, 1942 |